(12) United States Patent
Xiong et al.

(10) Patent No.: US 12,429,729 B2
(45) Date of Patent: Sep. 30, 2025

(54) DISPLAY SCREEN AND ELECTRONIC DEVICE

(71) Applicant: HUIZHOU TCL MOBILE COMMUNICATION CO., LTD., Guangdong (CN)

(72) Inventors: Panwei Xiong, Guangdong (CN); Jitao Ma, Guangdong (CN); Zhuwei Qiu, Guangdong (CN); Ke Lin, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/835,716

(22) PCT Filed: Jan. 4, 2023

(86) PCT No.: PCT/CN2023/070330
§ 371 (c)(1),
(2) Date: Aug. 2, 2024

(87) PCT Pub. No.: WO2023/151429
PCT Pub. Date: Aug. 17, 2023

(65) Prior Publication Data
US 2025/0147358 A1    May 8, 2025

(30) Foreign Application Priority Data

Feb. 9, 2022   (CN) .................. 202220269253.9

(51) Int. Cl.
*G02F 1/13357*   (2006.01)
*G02B 5/02*      (2006.01)
(Continued)

(52) U.S. Cl.
CPC ..... *G02F 1/133606* (2013.01); *G02B 5/0294* (2013.01); *G02F 1/133502* (2013.01);
(Continued)

(58) Field of Classification Search
CPC ......... G02F 1/133331; G02F 1/133502; G02F 1/133615; G02F 1/133603;
(Continued)

(56) References Cited

U.S. PATENT DOCUMENTS

2012/0218640 A1* 8/2012 Gollier .................... C03C 15/00
                                                        359/601
2017/0251086 A1* 8/2017 Gagne-Keats ............ B22F 5/00
(Continued)

FOREIGN PATENT DOCUMENTS

CN    106249472 A  * 12/2016  .......... G02B 6/0011
CN    210376735 U     4/2020
(Continued)

OTHER PUBLICATIONS

International Search Report in International application No. PCT/CN2023/070330, mailed on Feb. 22, 2023.
(Continued)

*Primary Examiner* — Erin Kryukova
(74) *Attorney, Agent, or Firm* — PV IP PC; Wei Te Chung

(57) ABSTRACT

A display screen and an electronic device are provided. The display screen includes a frame, a cover plate, and a display module. The cover plate and the display module are stacked on the frame. The display module includes a light-emitting unit. A surface of the cover plate is provided with an anti-glare layer formed by etching for scattering light emitted by the light-emitting unit and/or the display module includes a light-homogenizing structure for scattering the light emitted by the light-emitting unit.

16 Claims, 1 Drawing Sheet

(51) Int. Cl.
*G02F 1/1333* (2006.01)
*G02F 1/1335* (2006.01)

(52) U.S. Cl.
CPC .. *G02F 1/133603* (2013.01); *G02F 1/133608* (2013.01); *G02F 1/133331* (2021.01)

(58) Field of Classification Search
CPC ............ G02F 1/133608; G02B 5/0221; G02B 5/0294; G09F 9/301; G09F 39/301
See application file for complete search history.

(56) References Cited

U.S. PATENT DOCUMENTS

| | | | | |
|---|---|---|---|---|
| 2018/0356684 | A1* | 12/2018 | Chang | G02F 1/133603 |
| 2019/0349685 | A1* | 11/2019 | Choi | G02F 1/133608 |
| 2022/0365389 | A1* | 11/2022 | Aoki | G02F 1/134309 |
| 2023/0229036 | A1* | 7/2023 | Kuzuhara | G02B 1/11 349/122 |
| 2023/0236450 | A1* | 7/2023 | Hokari | B32B 17/06 428/172 |

FOREIGN PATENT DOCUMENTS

| | | | | |
|---|---|---|---|---|
| CN | 111488084 | A | | 8/2020 |
| CN | 212966127 | U | | 4/2021 |
| CN | 113194172 | A | | 7/2021 |
| CN | 213814199 | U | | 7/2021 |
| CN | 213904800 | U | | 8/2021 |
| CN | 214375721 | U | | 10/2021 |
| CN | 216902115 | U | | 7/2022 |
| DE | 102020001405 | A1 | * 9/2020 | ............ C03C 15/00 |
| KR | 20190055372 | A | * 5/2019 | |
| WO | 2015111660 | A1 | | 7/2015 |

OTHER PUBLICATIONS

Written Opinion of the International Search Authority in International application No. PCT/CN2023/070330, mailed on Feb. 22, 2023.

* cited by examiner

DISPLAY SCREEN AND ELECTRONIC DEVICE

CROSS REFERENCE TO RELATED APPLICATIONS

This application is a US national phase application based upon an International Application No. PCT/CN2023/070330, filed on Jan. 4, 2023, which claims priority to Chinese Patent Applications No. 202220269253.9, filed on Feb. 9, 2022 and entitled "DISPLAY SCREEN AND ELECTRONIC DEVICE". The entire disclosures of the above application are incorporated herein by reference.

TECHNICAL FIELD

The present application relates to the field of display device technologies, and in particular to a display screen and an electronic device.

BACKGROUND TECHNOLOGY

As a human-computer interaction device, display screens have been widely used in electronic devices such as mobile phones and tablets. Due to the needs of work and study, people spend more and more time using electronic devices. However, existing display screens still have some defects that may cause visual discomfort to users, easily damage eyesight, and are not conducive to eye protection.

SUMMARY OF INVENTION

Technical Problem

Embodiments of the present application provide a display screen and an electronic device to solve the problem that the existing display screen is not conducive to eye protection.

Problem Solutions

Technical Solutions

In one aspect, the present application provides a display screen, including a frame, a cover plate, and a display module. The cover plate and the display module are stacked on the frame. The display module includes a light-emitting unit. A surface of the cover plate is provided with an anti-glare layer formed by etching for scattering light emitted by the light-emitting unit and/or the display module includes a light-homogenizing structure for scattering the light emitted by the light-emitting unit.

In the display screen of the present application, the light-emitting unit is an LED, the display module further includes a flexible screen, three diffusion sheets, a light guide plate, and a reflective sheet, the cover plate, the flexible screen, the three diffusion sheets, the light guide plate, and the reflective sheet are sequentially stacked on the frame, and the LED is disposed on one side of the light guide plate.

The surface of the cover plate is provided with the anti-glare layer formed by etching for scattering the light emitted by the light-emitting unit, and/or a surface of the flexible screen is provided with an anti-glare layer formed by etching, and the anti-glare layer on the surface of the flexible screen forms the light-homogenizing structure.

In the display screen of the present application, the light-emitting unit is an OLED, the surface of the cover plate is provided with the anti-glare layer formed by etching for scattering the light emitted by the light-emitting unit, and/or a surface of the OLED is provided with an anti-glare layer formed by etching, and the anti-glare layer on the surface of the OLED forms the light-homogenizing structure.

In the display screen of the present application, the light-emitting unit is a mini-LED, the display module further includes an LCD, three diffusion sheets, and a reflective sheet, the cover plate, the LCD, the three diffusion sheets, the mini-LED, and the reflective sheet are stacked, and the mini-LED and the three diffusion sheets form the light-homogenizing structure.

In the display screen of the present application, a light transmittance of the three diffusion sheets is 80% to 90%.

In the display screen of the present application, the surface of the cover plate is provided with the anti-glare layer formed by etching for scattering the light emitted by the light-emitting unit.

In the display screen of the present application, a thickness of the anti-glare layer is less than or equal to 30 μm.

In the display screen of the present application, an anti-reflection and transmission enhancement layer is disposed on the anti-glare layer.

In the display screen of the present application, a thickness of the anti-reflection and transmission enhancement layer ranges from 150 nm to 380 nm.

On the other hand, the present application also provides an electronic device, the electronic device includes a display screen, and the display screen includes the following.

In the electronic device of the present application, the light-emitting unit is an LED, the display module further includes a flexible screen, three diffusion sheets, a light guide plate, and a reflective sheet, the cover plate, the flexible screen, the three diffusion sheets, the light guide plate, and the reflective sheet are sequentially stacked on the frame, and the LED is disposed on one side of the light guide plate.

The surface of the cover plate is provided with the anti-glare layer formed by etching for scattering the light emitted by the light-emitting unit, and/or a surface of the flexible screen is provided with an anti-glare layer formed by etching, and the anti-glare layer on the surface of the flexible screen forms the light-homogenizing structure.

In the electronic device of the present application, the light-emitting unit is an OLED, the surface of the cover plate is provided with the anti-glare layer formed by etching for scattering the light emitted by the light-emitting unit, and/or a surface of the OLED is provided with an anti-glare layer formed by etching, and the anti-glare layer on the surface of the OLED forms the light-homogenizing structure.

In the electronic device of the present application, the light-emitting unit is a mini-LED, the display module further includes an LCD, three diffusion sheets, and a reflective sheet, the cover plate, the LCD, the three diffusion sheets, the mini-LED, and the reflective sheet are stacked, and the mini-LED and the three diffusion sheets form the light-homogenizing structure.

In the electronic device of the present application, a light transmittance of the three diffusion sheets is 80% to 90%.

In the electronic device of the present application, the surface of the cover plate is provided with the anti-glare layer formed by etching for scattering the light emitted by the light-emitting unit.

In the electronic device of the present application, a thickness of the anti-glare layer is less than or equal to 30 μm.

In the electronic device of the present application, an anti-reflection and transmission enhancement layer is disposed on the anti-glare layer.

In the electronic device of the present application, a thickness of the anti-reflection and transmission enhancement layer ranges from 150 nm to 380 nm.

Beneficial Effects of Invention

Beneficial Effects

The advantages of the present application are as follows. In the display screen provided in the embodiments of the present application, the surface of the cover plate is provided with the anti-glare layer formed by etching and/or the display module includes the light-homogenizing structure for scattering the light emitted by the light-emitting unit. The anti-glare layer formed by etching on the surface of the cover plate is uneven, which can make the light of the light-emitting unit diffusely reflected at multiple angles. Therefore, by providing the anti-glare layer, the light emitted by the light-emitting unit can be scattered and made uniform, thereby making it comfortable for the eyes when the light enters, and achieving the effect of protecting the eyes. The light-homogenizing structure of the display module can scatter the light emitted by the light-emitting unit, making the light emitted by the light-emitting unit more uniform, thereby making it comfortable for the eyes when the light enters, and achieving the effect of protecting the eyes.

BRIEF DESCRIPTION OF THE DRAWINGS

Description of Drawings

The technical solutions and advantages of embodiments described herein will become apparent from elaboration of embodiments in conjunction with the accompanying drawings.

Figure 1:
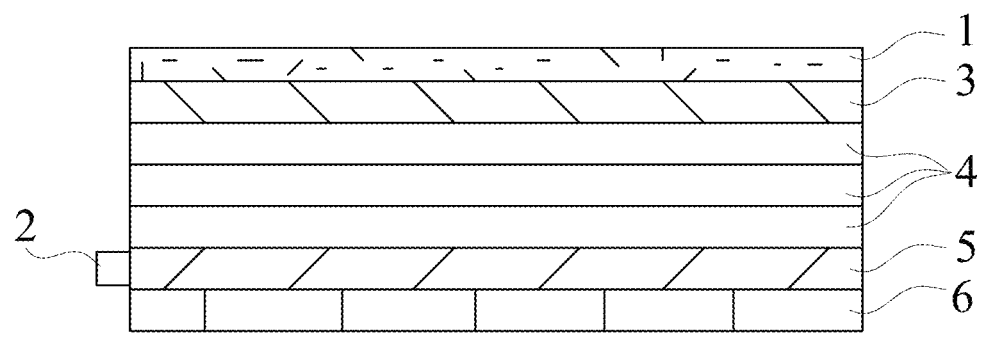

FIG. 1 is a first schematic diagram of a display screen according to an embodiment of the present application.

Figure 2:
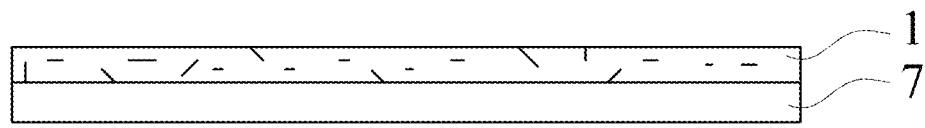

FIG. 2 is a second schematic diagram of a display screen according to an embodiment of the present application.

Figure 3:
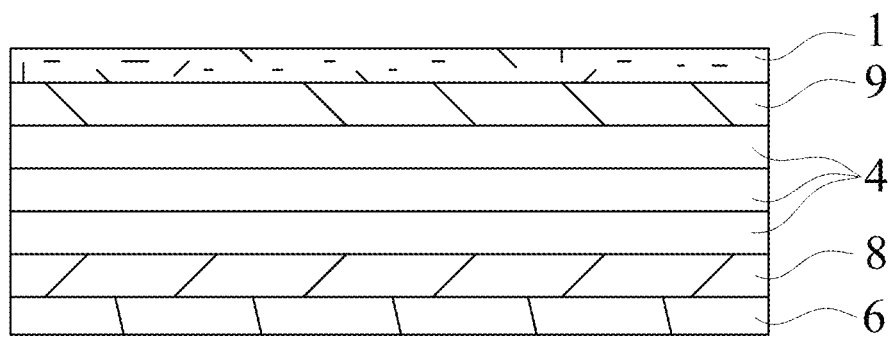

FIG. 3 is a third schematic diagram of a display screen according to an embodiment of the present application.

DESCRIPTION OF REFERENCE NUMERALS

1: cover plate; 2: LED; 3: flexible screen; 4: diffusion sheet; 5: light guide plate; 6: reflective sheet; 7: OLED; 8: mini-LED; 9: LCD

DETAILED DESCRIPTION OF THE PREFERRED EMBODIMENTS

Embodiments of Invention

The technical solutions in the embodiments of the present disclosure will be clearly and completely described below with reference to the accompanying drawings in the embodiments of the present disclosure. Obviously, the described embodiments are only some, but not all, embodiments of the present disclosure. Based on the embodiments in the present disclosure, all other embodiments obtained by those skilled in the art without creative efforts shall fall within the protection scope of the present disclosure.

An embodiment of the present application provides a display screen. The display screen includes a frame, a cover plate 1, and a display module. The cover plate 1 and the display module are stacked on the frame. The display module includes a light-emitting unit. A surface of the cover plate 1 is provided with an anti-glare layer formed by etching for scattering light emitted by the light-emitting unit and/or the display module includes a light-homogenizing structure for scattering the light emitted by the light-emitting unit. The anti-glare layer is referred to as an AG (Anti-Glare) layer.

Specifically, an uneven anti-glare layer is formed by etching on the surface of the cover plate 1. The uneven anti-glare layer can diffusely reflect the light of the light-emitting unit at multiple angles. Therefore, by setting the anti-glare layer, the light emitted by the light-emitting unit can be scattered and made uniform, thereby making it comfortable for the eyes when the light enters, and achieving the effect of protecting the eyes. The light-homogenizing structure of the display module can scatter the light emitted by the light-emitting unit, making the light emitted by the light-emitting unit more uniform, thereby making it comfortable for the eyes when the light enters, and achieving the effect of protecting the eyes.

As shown in FIG. 1, in some embodiments of the present application, the light-emitting unit is an LED 2 (light-emitting diode). The display module further includes a flexible screen 3, three diffusion sheets 4, a light guide plate 5, and a reflective sheet 6. The cover plate 1, the flexible screen 3, the three diffusion sheets 4, the light guide plate 5, and the reflective sheet 6 are sequentially stacked on the frame. The LED 2 is disposed on one side of the light guide plate 5. The surface of the cover plate 1 is provided with the anti-glare layer formed by etching for scattering the light emitted by the light-emitting unit, and/or a surface of the flexible screen 3 is provided with an anti-glare layer formed by etching. The anti-glare layer on the surface of the flexible screen 3 forms the light-homogenizing structure. It should be understood that the uneven anti-glare layer formed by etching on the surface of the flexible screen 3 can also diffusely reflect the light of the light-emitting unit at multiple angles, thereby scattering the light emitted by the light-emitting unit and making it uniform, so that eyes are comfortable when the light enters and the effect of eye protection is achieved.

Alternatively, the anti-glare layer formed by etching may be provided only on the surface of the cover plate 1, or the anti-glare layer formed by etching may be provided only on the surface of the flexible screen 3, or the anti-glare layer formed by etching may be provided on both the surface of the cover plate 1 and the surface of the flexible screen 3. When the anti-glare layer formed by etching is provided only on the surface of the flexible screen 3, the cover plate 1 is a common cover plate. When the anti-glare layer formed by etching is provided on both the surface of the cover plate 1 and the surface of the flexible screen 3, the light emitted by the light-emitting unit can be scattered more evenly, so that eyes are comfortable when the light enters, and the eye protection effect can be better.

It is understood that a conventional display module includes an LCD (liquid crystal display), a diffusion sheet, a light guide plate, a reflective sheet, and an LED. In the display module in the embodiment of the present application, the LCD in the conventional display module is replaced with the flexible screen 3. The flexible screen 3 is foldable and thinner and lighter, thereby reducing an overall weight and thickness of the display screen, making the display screen more portable.

Alternatively, the anti-glare layer on the surface of the cover plate 1 can be disposed on a side of the cover plate 1 facing the flexible screen 3, or can be disposed on a side of the cover plate 1 facing away from the flexible screen 3. Alternatively, the anti-glare layer is disposed on both the side of the cover plate 1 facing the flexible screen 3 and the side of the cover plate 1 facing away from the flexible screen 3. Similarly, the anti-glare layer on the surface of the flexible screen 3 can be disposed on a side of the flexible screen 3 facing the cover plate 1, or can be disposed on a side of the flexible screen 3 facing away from the cover plate 1. Alternatively, the anti-glare layer is disposed on both the side of the flexible screen 3 facing the cover plate 1 and the side of the flexible screen 3 facing away from the cover plate 1. Preferably, a thickness of the anti-glare layer is less than or equal to 30 μm. The anti-glare layer in this thickness range has the best eye protection effect.

It should be understood that the anti-glare layer formed by etching on the surface of the cover plate 1 facing away from the flexible screen 3 can also diffusely reflect ambient light at multiple angles, thereby reducing the interference of ambient light, increasing a viewing angle of an image, reducing screen reflection, and providing users with better visual experience.

Alternatively, when the surface of the cover plate 1 and/or the surface of the flexible screen 3 is provided with the anti-glare layer formed by etching for scattering the light emitted by the light-emitting unit, an anti-reflection and transmission enhancement layer is also provided on the anti-glare layer. The anti-reflection and transmission enhancement layer is referred to as an AR (anti-reflection) layer. The anti-reflection and transmission enhancement layer can improve light transmittance and reduce reflectivity, thereby reducing screen reflection and making the display screen more effective in protecting the eyes. Preferably, a thickness of the anti-reflection and transmission enhancement layer ranges from 150 nm to 380 nm. The anti-reflection and transmission enhancement layer in this thickness range has the best eye protection effect.

As shown in FIG. 2, in some embodiments of the present application, the light-emitting unit is an OLED 7 (organic light-emitting diode). The cover plate 1 and the OLED 7 are stacked on the frame. The surface of the cover plate 1 is provided with the anti-glare layer formed by etching for scattering the light emitted by the light-emitting unit, and/or a surface of the OLED 7 is provided with an anti-glare layer formed by etching, and the anti-glare layer on the surface of the OLED 7 forms the light-homogenizing structure. It should be understood that the uneven anti-glare layer formed by etching on the surface of the OLED 7 can also make the light of the light-emitting unit diffusely reflect at multiple angles, thereby scattering the light emitted by the light-emitting unit and making it uniform, so that eyes are comfortable when the light enters, and the eye protection effect is achieved.

It is understandable that since the OLED 7 has its own light source, the display screen does not need to add the LCD, the diffusion sheet, the light guide plate, the reflective sheet, and the LED in the traditional display module, which reduces an overall weight and thickness of the display screen, making the display screen more portable. In addition, the OLED 7 has a higher brightness, so the display effect is better.

Alternatively, the anti-glare layer formed by etching may be provided only on the surface of the cover plate 1, or only on the surface of the OLED 7, or both on the surface of the cover plate 1 and the surface of the OLED 7. When the anti-glare layer formed by etching is provided only on the surface of the OLED 7, the cover plate 1 is an ordinary cover plate. When the anti-glare layer formed by etching is provided on both the surface of the cover plate 1 and the surface of the OLED 7, the light emitted by the light-emitting unit can be scattered more evenly, so that eyes are comfortable when the light enters, and the eye protection effect can be better.

Specifically, the anti-glare layer on the surface of the cover plate 1 can be arranged on a side of the cover plate 1 facing the OLED 7, or on a side of the cover plate 1 facing away from the OLED 7. Alternatively, the anti-glare layer is arranged on both the side of the cover plate 1 facing the OLED 7 and the side of the cover plate 1 facing away from the OLED 7. The anti-glare layer on the surface of the OLED 7 is preferably arranged on the side of the OLED 7 facing the cover plate 1. Preferably, a thickness of the anti-glare layer is less than or equal to 30 μm. The anti-glare layer in this thickness range has the best eye protection effect.

It should be understood that the anti-glare layer formed by etching on the surface of the cover plate 1 facing away from the OLED 7 can also diffusely reflect ambient light at multiple angles, thereby reducing interference from ambient light, increasing a viewing angle of an image, reducing screen reflection, and providing users with better visual experience.

Alternatively, when the surface of the cover plate 1 and/or the surface of the OLED 7 is provided with the anti-glare layer formed by etching for scattering the light emitted by the light-emitting unit, an anti-reflection and transmission enhancement layer is also provided on the anti-glare layer. The anti-reflection and transmission enhancement layer can improve the light transmittance and reduce the reflectivity, thereby reducing the screen reflection and making the display screen more effective in protecting the eyes. Preferably, a thickness of the anti-reflection and transmission enhancement layer ranges from 150 nm to 380 nm. The anti-reflection and transmission enhancement layer in this thickness range has a better eye protection effect.

As shown in FIG. 3, in some embodiments of the present application, the light-emitting unit is a mini-LED 8. The display module also includes an LCD 9, three diffusion sheets 4, and a reflective sheet 6. The cover plate 1, the LCD 9, the three diffusion sheets 4, the mini-LED 8, and the reflective sheet 6 are stacked. The mini-LED 8 and the three diffusion sheets 4 form the light-homogenizing structure. Compared with a traditional LED, the mini-LED 8 emits light more evenly, does not have the problem of uneven light of the traditional LED, and has lower power consumption. The mini-LED 8 with the three diffusion sheets 4 can scatter the light more evenly, making it comfortable for the eyes without reducing the brightness. It can maintain the same brightness as the traditional module or even improve the brightness, solving the low brightness problem of traditional eye protection solutions and the problem that the display screen cannot be used outdoors due to low brightness, allowing users to use the display screen outdoors.

It is understandable that another conventional display module includes an upper light-enhancing sheet, a lower light-enhancing sheet, a diffusion sheet, a light guide plate, a reflective sheet, and an LED. The display module in the embodiments of the present application adopts a structure of three diffusion sheets 4 to replace the upper light-enhancing sheet, the lower light-enhancing sheet, the diffusion sheet, and the light guide plate in the conventional display module, thereby reducing an overall weight and thickness of the display screen and making the display screen more portable. Preferably, a light transmittance of the three diffusion sheets 4 is 80% to 90%. The use of the diffusion sheet 4 with high light transmittance can scatter the light more evenly, so that eyes are comfortable when the light enters, and the eye protection effect can be better.

Alternatively, the surface of the cover plate 1 is provided with the anti-glare layer formed by etching for scattering the light emitted by the light-emitting unit. That is, in the embodiments of the present application, a common cover plate 1 can be selected, or a cover plate 1 having the anti-glare layer formed by etching on the surface can be selected. Preferably, a thickness of the anti-glare layer is less than or equal to 30 μm, and the anti-glare layer in this thickness range has the best eye protection effect.

Alternatively, the anti-glare layer on the surface of the cover plate 1 can be disposed on a side of the cover plate 1 facing the LCD 9, or on a side of the cover plate 1 facing away from the LCD 9. It should be understood that the anti-glare layer formed by etching on the side of the cover plate 1 facing away from the LCD 9 can also diffusely reflect ambient light at multiple angles, thereby reducing the interference of ambient light, improving a viewing angle of an image, reducing screen reflection, and providing users with better visual experience.

Alternatively, when the surface of the cover plate 1 is provided with the anti-glare layer formed by etching for scattering the light emitted by the light-emitting unit, an anti-reflection and transmission enhancement layer is also provided on the anti-glare layer. The anti-reflection and transmission enhancement layer can improve the light transmittance and reduce the reflectivity, thereby reducing the screen reflection and making the display screen more effective in protecting the eyes. Preferably, a thickness of the anti-reflection and transmission enhancement layer ranges from 150 nm to 380 nm. The anti-reflection and transmission enhancement layer in this thickness range has the best eye protection effect.

An embodiment of the present application further provides an electronic device. The electronic device includes the display screen described in any of the above embodiments. The electronic device may be, but is not limited to, a tablet, a mobile phone, a laptop, a television, or an e-book reader.

In the embodiments above, the description of each embodiment has its own emphasis. For a part that is not described in detail in one embodiment, reference may be made to related descriptions in other embodiments.

In the description of this application, terms such as "first" and "second" are used only for the purpose of description, and should not be understood as indicating or implying the relative importance or implicitly specifying the number of the indicated technical features. Therefore, when features are defined by "first" and "second", at least one such feature can be explicitly or implicitly included.

The display screen and the electronic device provided by the embodiments of the present disclosure are described above in detail. The principles and implementations of the present disclosure are described in this specification by using specific examples, and the descriptions of the above embodiments are only used to help understand the method and the core idea of the present disclosure. Meanwhile, for those skilled in the art, according to the idea of the present disclosure, there will be changes in the specific implementation manner and application scope. In conclusion, the content of this specification should not be construed as a limitation on the present disclosure.

What is claimed is:

1. A display screen, comprising a frame, a cover plate, and a display module, wherein the cover plate and the display module are stacked on the frame, the display module comprises a light-emitting unit, a surface of the cover plate is provided with an anti-glare layer formed by etching for scattering light emitted by the light-emitting unit and/or the display module comprises a light-homogenizing structure for scattering the light emitted by the light-emitting unit;
   wherein the light-emitting unit is an LED, the display module further comprises a flexible screen, three diffusion sheets, a light guide plate, and a reflective sheet, the cover plate, the flexible screen, the three diffusion sheets, the light guide plate, and the reflective sheet are sequentially stacked on the frame, and the LED is disposed on one side of the light guide plate;
   the surface of the cover plate is provided with the anti-glare layer formed by etching for scattering the light emitted by the light-emitting unit, the anti-glare layer is uneven, a surface of the flexible screen is provided with another anti-glare layer formed by etching, the another anti-glare layer on the surface of the flexible screen forms the light-homogenizing structure, and the another anti-glare layer is uneven.

2. The display screen according to claim 1, wherein the light-emitting unit is an OLED, the surface of the cover plate is provided with the anti-glare layer formed by etching for scattering the light emitted by the light-emitting unit, and/or a surface of the OLED is provided with an anti-glare layer formed by etching, and the anti-glare layer on the surface of the OLED forms the light-homogenizing structure.

3. The display screen according to claim 1, wherein the light-emitting unit is a mini-LED, the display module further comprises an LCD, three diffusion sheets, and a reflective sheet, the cover plate, the LCD, the three diffusion sheets, the mini-LED, and the reflective sheet are stacked, and the mini-LED and the three diffusion sheets form the light-homogenizing structure.

4. The display screen according to claim 3, wherein a light transmittance of the three diffusion sheets is 80% to 90%.

5. The display screen according to claim 3, wherein the surface of the cover plate is provided with the anti-glare layer formed by etching for scattering the light emitted by the light-emitting unit.

6. The display screen according to claim 1, wherein a thickness of the anti-glare layer is less than or equal to 30 μm.

7. The display screen according to claim 1, further comprising an anti-reflection and transmission enhancement layer disposed on the anti-glare layer.

8. The display screen according to claim 7, wherein a thickness of the anti-reflection and transmission enhancement layer ranges from 150 nm to 380 nm.

9. An electronic device, comprising a display screen, wherein the display screen comprises a frame, a cover plate, and a display module, the cover plate and the display module are stacked on the frame, the display module comprises a light-emitting unit, a surface of the cover plate is provided with an anti-glare layer formed by etching for scattering light emitted by the light-emitting unit and/or the display module comprises a light-homogenizing structure for scattering the light emitted by the light-emitting unit;
   wherein the light-emitting unit is an LED, the display module further comprises a flexible screen, three diffusion sheets, a light guide plate, and a reflective sheet, the cover plate, the flexible screen, the three diffusion sheets, the light guide plate, and the reflective sheet are sequentially stacked on the frame, and the LED is disposed on one side of the light guide plate;

the surface of the cover plate is provided with the anti-glare layer formed by etching for scattering the light emitted by the light-emitting unit, the anti-glare layer is uneven, a surface of the flexible screen is provided with another anti-glare layer formed by etching, the another anti-glare layer on the surface of the flexible screen forms the light-homogenizing structure, and the another anti-glare layer is uneven.

10. The electronic device according to claim 9, wherein the light-emitting unit is an OLED, the surface of the cover plate is provided with the anti-glare layer formed by etching for scattering the light emitted by the light-emitting unit, and/or a surface of the OLED is provided with an anti-glare layer formed by etching, and the anti-glare layer on the surface of the OLED forms the light-homogenizing structure.

11. The electronic device according to claim 9, wherein the light-emitting unit is a mini-LED, the display module further comprises an LCD, three diffusion sheets, and a reflective sheet, the cover plate, the LCD, the three diffusion sheets, the mini-LED, and the reflective sheet are stacked, and the mini-LED and the three diffusion sheets form the light-homogenizing structure.

12. The electronic device according to claim 11, wherein a light transmittance of the three diffusion sheets is 80% to 90%.

13. The electronic device according to claim 11, wherein the surface of the cover plate is provided with the anti-glare layer formed by etching for scattering the light emitted by the light-emitting unit.

14. The electronic device according to claim 9, wherein a thickness of the anti-glare layer is less than or equal to 30 μm.

15. The electronic device according to claim 9, further comprising an anti-reflection and transmission enhancement layer disposed on the anti-glare layer.

16. The electronic device according to claim 15, wherein a thickness of the anti-reflection and transmission enhancement layer ranges from 150 nm to 380 nm.

* * * * *